United States Patent
Yoo (10) Patent No.: US 9,209,734 B2
(45) Date of Patent: *Dec. 8, 2015

(54) APPARATUS FOR ESTIMATING PARAMETER IN INDUCTION MOTOR

(71) Applicant: LSIS CO., LTD., Anyang-si, Gyeonggi-do (KR)

(72) Inventor: Anno Yoo, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 112 days.

This patent is subject to a terminal disclaimer.

(21) Appl. No.: 14/049,077

(22) Filed: Oct. 8, 2013

(65) Prior Publication Data

US 2014/0132200 A1     May 15, 2014

(30) Foreign Application Priority Data

Nov. 9, 2012   (KR) .......................... 10-2012-0126567

(51) Int. Cl.
*H02P 21/14* (2006.01)

(52) U.S. Cl.
CPC ...................... *H02P 21/14* (2013.01)

(58) Field of Classification Search
USPC .......... 318/798, 400.04, 400.32, 492, 400.02, 318/766
See application file for complete search history.

(56) References Cited

U.S. PATENT DOCUMENTS

| 5,998,958 A * | 12/1999 | Lee ...................... G01R 31/343 318/801 |
| 2004/0135539 A1* | 7/2004 | Iwashita et al. ............... 318/807 |
| 2009/0021208 A1* | 1/2009 | Romenesko .......... H02P 21/145 318/807 |
| 2011/0084638 A1* | 4/2011 | Patel ........................ B60K 1/02 318/400.32 |
| 2011/0285342 A1* | 11/2011 | Campbell ............. H02P 21/145 318/798 |

FOREIGN PATENT DOCUMENTS

| JP | 01-194883 | 8/1989 |
| JP | 09-019199 | 1/1997 |
| JP | 2002-300799 | 10/2002 |

OTHER PUBLICATIONS

JP, 2002-300799; Inverter Control System and Inverter Control Method by Shinoda Naonobu.*
Japan Patent Office Application Serial No. 2013-215220, Office Action dated Oct. 7, 2014, 3 pages.

* cited by examiner

*Primary Examiner* — Shawki S Ismail
*Assistant Examiner* — Muhammad S Islam
(74) *Attorney, Agent, or Firm* — Lee, Hong, Degerman, Kang & Waimey (57) ABSTRACT

An apparatus for estimating a parameter of an induction motor is provided. The estimating apparatus receives an output from a current controller and d and q-axis currents in a synchronous reference frame applied to an induction motor, calculates an error of rotor resistance, and obtains a difference between the rotor resistance and nominal rotor resistance to calculate stator resistance therefrom.

8 Claims, 5 Drawing Sheets

APPARATUS FOR ESTIMATING PARAMETER IN INDUCTION MOTOR

CROSS-REFERENCE TO RELATED APPLICATION

Pursuant to 35 U.S.C. §119(a), this application claims the benefit of earlier filing date and right of priority to Korean Application No. 10-2012-0126567, filed on Nov. 9, 2012, the contents of which is incorporated by reference herein in its entirety.

BACKGROUND OF THE INVENTION

1. Field of the Invention

The present disclosure relates to an apparatus for estimating a parameter of an induction motor in real time.

2. Background of the Invention

In general, a general-purpose inverter is commonly used to drive 3-phase induction motor, and in particular, a general-purpose inverter is commonly used in a variable speed driving field using an induction motor, a hoisting load, or a traction load of an electric vehicle, Among parameters of an induction motor, stator resistance and rotor resistance values are changed when a temperature within the induction motor is changed according to a change in a load. Vector control commonly used as an induction motor driving method is significantly dependent upon a motor parameter, so fluctuation of the rotor resistance degrades control performance. This will be described with reference to the accompanying drawings.

Figure 1:
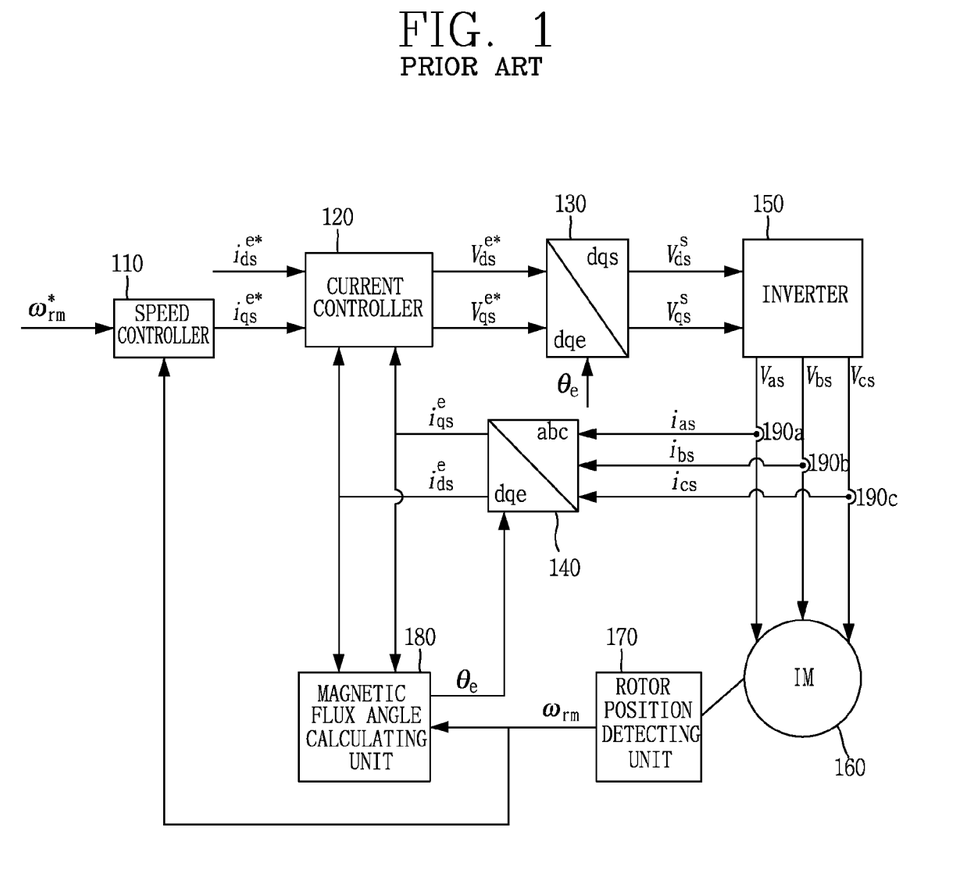
FIG. 1 is a view illustrating a configuration of a related art system for controlling an induction motor.

FIG. 1 is a view illustrating a configuration of a related art system for controlling an induction motor.

A speed controller 110 receives a rotor speed reference an actual rotor speed and outputs a q-axis current reference in a synchronous reference frame. A current controller 120 outputs d and q-axis voltages in the synchronous reference frame from d and q-axis current references in the synchronous reference frame and an actual current.

A first converting unit 130 converts output voltages from the current controller 120 into voltages in a stationary reference frame, and a second converting unit 140 converts phase currents from an induction motor 160 measured by current sensors 190a, 190b, and 190c into d and q-axis currents in the synchronous reference frame.

An inverter 150 applies voltages to the induction motor 160. A rotor position detecting unit 170 measures a speed of a rotor of the induction motor 160. A magnetic flux angle calculating unit 180 calculates a magnetic flux angle by using the speed of the rotor measured by the rotor position detecting unit 170 and the d and q-axis currents in the synchronous reference frame, and in this case, the d-axis current in the synchronous reference frame may be replaced by a d-axis current reference.

Figure 2:
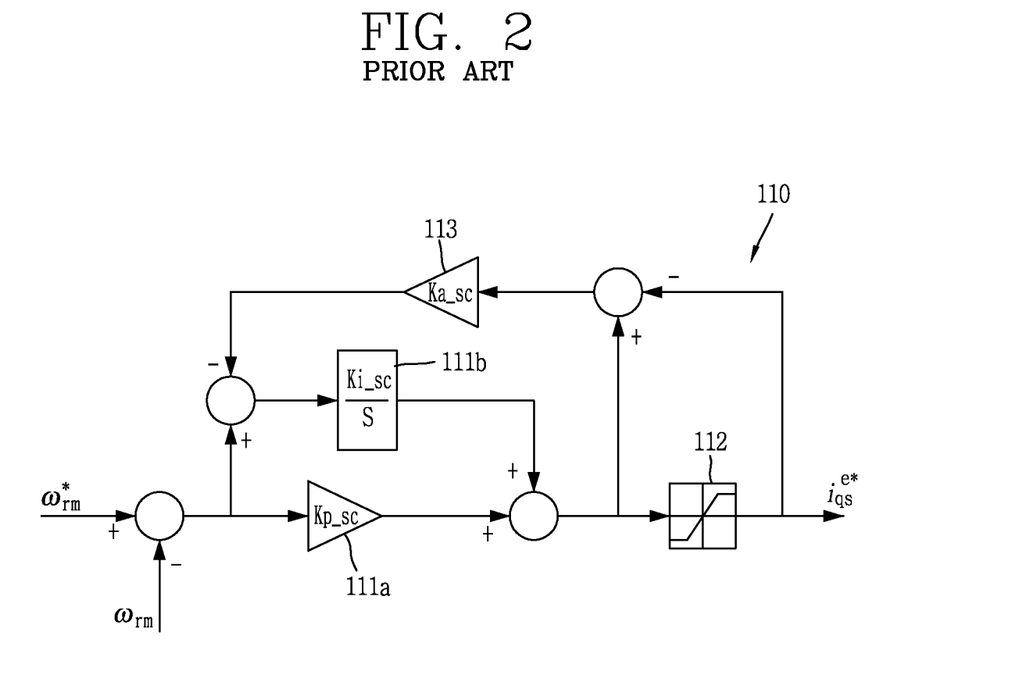
FIG. 2 is a view illustrating a detailed configuration of a speed controller of FIG. 1.

FIG. 2 is a view illustrating a detailed configuration of the speed controller in FIG. 1.

As illustrated in FIG. 2, the speed controller 110 outputs a difference between a reference speed (or speed reference) and an actual speed (or a feedback speed), as a q-axis current reference by using proportional-integral controllers 111a and 111b. A limiter 112 limits an output from the speed controller 110, and a gaining unit 113 provides an anti-windup gain to prevent divergence of the integrator 111b when the limiter 112 operates.

Figure 3A:
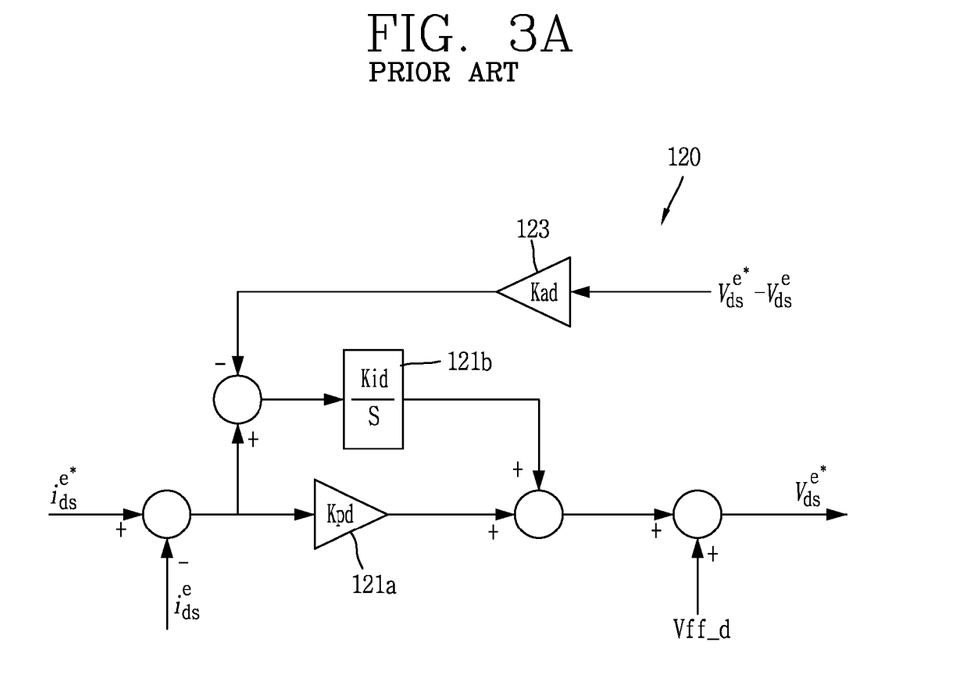
FIGS. 3A and 3B are views illustrating a detailed configuration of a current controller of FIG. 1.
Figure 3B:
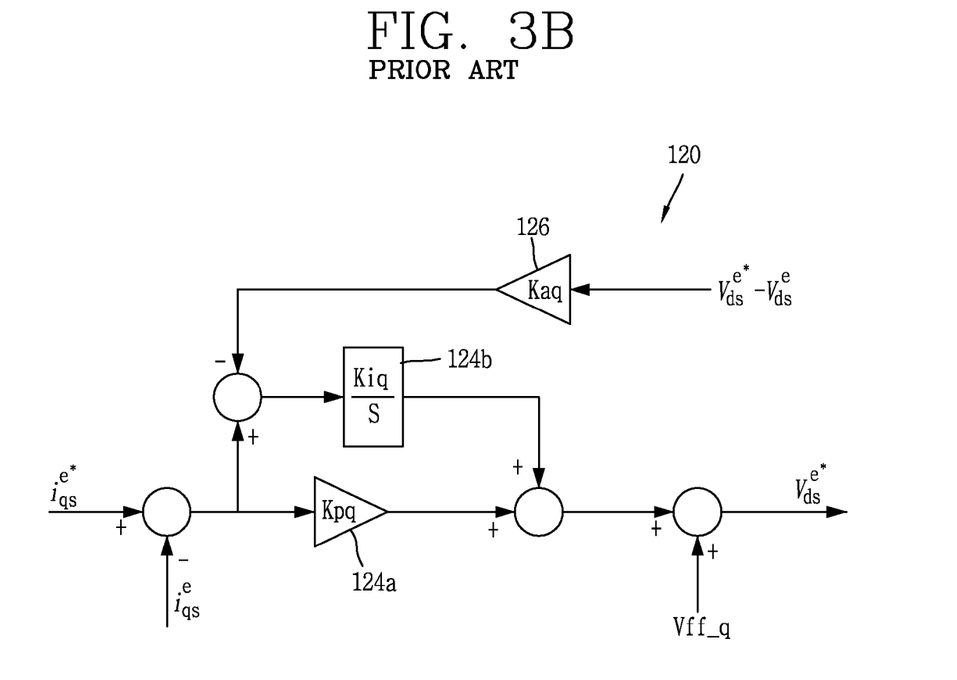

FIGS. 3A and 3B are views illustrating detailed configurations of the current controller in FIG. 1, respectively. Specifically, FIG. 3A is a view illustrating a d-axis current controller in the synchronous reference frame, and FIG. 3B is a view illustrating a configuration of a q-axis current controller in the synchronous reference frame. As illustrated, in order to control d and q-axis currents in the synchronous reference frame, the d and q-axis current controllers include proportional and integral-type controllers 121a and 121b, and 124a and 124b, and feed-forwarding units 122 and 125, respectively.

The feed-forwarding units 122 and 125 may be variously configured according to modeling of an induction motor. When an output from the current controller exceeds a magnitude of a voltage for the inverter to synthesize it, gaining units 123 and 126 provide an anti-windup gain to prevent divergence of integral controllers 121b and 124b.

An operation of the related art apparatus for controlling an induction motor will be described.

The first converting unit 130 converts voltages in a synchronous reference frame, as outputs from the current controller 120, into voltages in a stationary reference frame, which may be expressed as follows.

$$V_{ds}^{s}=V_{ds}^{e*}\cos\theta_e - V_{qs}^{e*}\sin\theta_e \quad \text{[Equation 1]}$$

$$V_{qa}^{s}=V_{ds}^{e*}\cos\theta_e + V_{qs}^{e*}\sin\theta_e \quad \text{[Equation 2]}$$

The second converting unit 140 obtains d and q-axis currents in the synchronous reference frame from phase currents of the induction motor 160 measured by the current sensor 190, which may be expressed as follows.

$$i_{ds}^{s} = \frac{2i_{as} - i_{bs} - i_{cs}}{3} \quad \text{[Equation 3]}$$

$$i_{qs} = \frac{i_{bs} - i_{cs}}{\sqrt{3}} \quad \text{[Equation 4]}$$

$$i_{ds}^{e} = i_{ds}^{s}\cos\theta_e + i_{qs}^{s}\sin\theta_e \quad \text{[Equation 5]}$$

$$i_{qs}^{e} = -i_{ds}^{s}\sin\theta_e + i_{qs}^{s}\cos\theta_e \quad \text{[Equation 6]}$$

The magnetic flux angle calculating unit 180 obtains magnetic flux angles required for angle conversion of the first converting unit 130 and the second converting unit 140, and here, in case of performing indirect vector control, the magnetic flux angles may be obtained as follows.

$$\omega_{sl} = \frac{R_r}{L_r} \frac{i_{qs}^{e}}{i_{ds}^{e*}} \quad \text{[Equation 7]}$$

$$\omega_e = \frac{P}{2}\omega_r + \omega_{sl} \quad \text{[Equation 8]}$$

$$\theta_e = \int \omega_e d\tau \quad \text{[Equation 9]}$$

Here, $\omega w_{sl}$ is a slip frequency, $L_r$ is rotor inductance, $R_r$ is rotor resistance, and P is a number of poles.

Meanwhile, in case of performing indirect vector control, rotor resistance is required to obtain a slip frequency by using Equation 7. However, the related art apparatus for controlling an induction motor illustrated in FIG. 1 does not estimate a parameter in real time, which is, thus, vulnerable to a change in a parameter. In particular, a value of rotor resistance of the induction motor 160 is changed according to a change in temperature of the induction motor 160, and a temperature of the induction motor is affected by a change in a load. An error in resistance of a stator occurring in such an environment degrades performance of current control.

SUMMARY OF THE INVENTION

Therefore, an aspect of the detailed description is to provide an apparatus for estimating a parameter of an induction motor capable of enhancing vector control performance by estimating a change in a parameter of an induction motor in real time.

To achieve these and other advantages and in accordance with the purpose of this specification, as embodied and broadly described herein, an apparatus for estimating a parameter of an induction motor including a current controller outputting d and q-axis voltages in a synchronous reference frame from d and q-axis current references and d and q-axis currents in the synchronous reference frame applied to the induction motor and a magnetic flux angle calculating unit calculating a magnetic flux angle by using d and q-axis currents in the synchronous reference frame applied to the induction motor and a rotor speed of the induction motor, in a control system includes a state estimator configured to calculate an error of rotor resistance upon receiving an output from the current controller and the d and q-axis currents in the synchronous reference frame applied to the induction motor; an integral controller configured to obtain a difference between the rotor resistance output from the state estimator and nominal rotor resistance; and a calculating unit configured to calculate stator resistance from an output from the integral controller, wherein the calculating unit calculates rotor resistance by $$R_s = \frac{M}{i_{ds}^e},$$

and the output from the integral controller is provided to the current controller and the magnetic flux angle calculating unit, so as to be updated, wherein $R_s$ is stator resistance, $$M = \frac{K_I}{s}(i_{ds}^{e*} - i_{ds}^e),$$

and $i_{ds}^e$ may be a d-axis current in the synchronous reference frame.

To achieve these and other advantages and in accordance with the purpose of this specification, as embodied and broadly described herein, an apparatus for estimating a parameter of an induction motor including a current controller outputting d and q-axis voltages in a synchronous reference frame from d and q-axis current references and d and q-axis currents in the synchronous reference frame applied to the induction motor and a magnetic flux angle calculating unit calculating a magnetic flux angle by using d and q-axis currents in the synchronous reference frame applied to the induction motor and a rotor speed of the induction motor, in a control system includes a state estimator configured to calculate an error of rotor resistance upon receiving an output from the current controller and the d and q-axis currents in the synchronous reference frame applied to the induction motor; an integral controller configured to obtain a difference between the rotor resistance output from the state estimator and nominal rotor resistance; and a calculating unit configured to calculate stator resistance from an output from the integral controller, wherein the calculating unit calculates rotor resistance by $$R_s = \frac{N}{i_{qs}^e},$$

and the output from the integral controller is provided to the current controller and the magnetic flux angle calculating unit, so as to be updated, wherein $$N = \frac{K_I}{s}(i_{qs}^{e*} - i_{qs}^e)$$

and $i_{qs}^e$ may be a d-axis current in the synchronous reference frame.

In an embodiment of the present invention, the apparatus may further include a switch configured to switch as to whether to estimate rotor resistance according to a flag input.

In an embodiment of the present invention, an error of the rotor resistance may be calculated by $$\frac{1}{\Delta T_r} = \frac{\Delta R_r}{L_r} = \frac{i_{ds}^e(Mi_{qs}^e - Ni_{ds}^e)}{i_{qs}^e(\sigma L_s(i_{qs}^e)^2 + L_s(i_{ds}^e)^2)},$$

wherein $\Delta T_r$ may be a reciprocal number of a value obtained by dividing rotor resistance by rotor impedance.

In an embodiment of the present invention, the integral controller may operate until when the error of the rotor resistance reaches 0.

In an embodiment of the present invention, a slip frequency of the induction motor may be calculated by $$\omega_{sl} = \frac{(\hat{R}_r + \Delta R_{r\_comp})}{L_r} \frac{i_{qs}^e}{i_{ds}^{e*}}.$$

According to embodiments of the present invention, the system for controlling an induction motor estimates a parameter of the induction motor in real time and reflects it in a control operation, thus enhancing performance of vector control.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

The present invention may be embodied in many different forms and may have various embodiments, of which particular ones will be illustrated in drawings and will be described in detail. However, it should be understood that the following exemplifying description of the invention is not meant to restrict the invention to specific forms of the present invention but rather the present invention is meant to cover all modifications, similarities and alternatives which are included in the spirit and scope of the present invention.

Hereinafter, embodiments according to the present invention will be described in detail with reference to the accompanying drawings.

Figure 4:
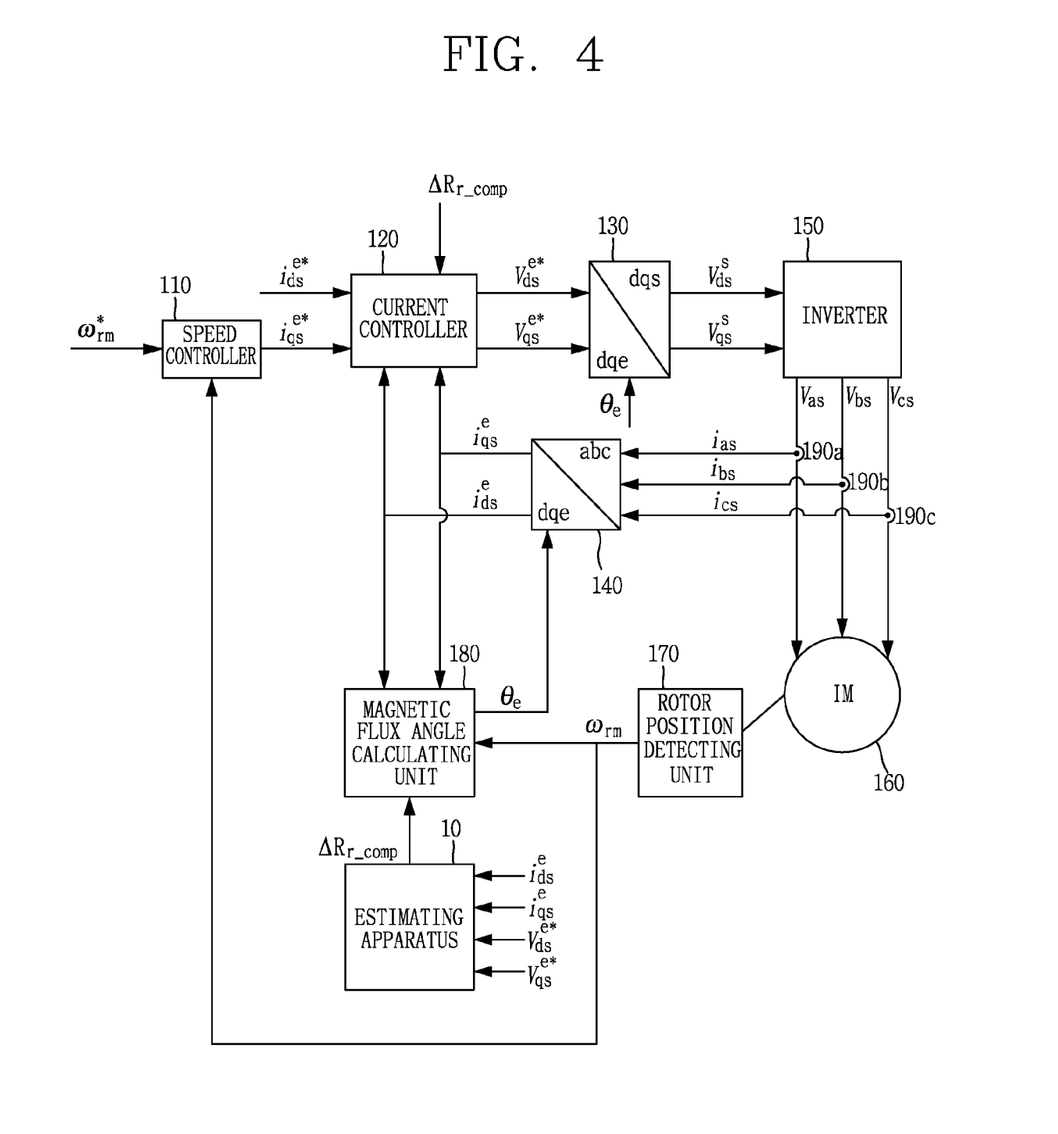
FIG. 4 is a view illustrating an embodiment of a system for controlling an induction motor to which the present invention is applied.

FIG. 4 is a view illustrating an embodiment of a system for controlling an induction motor to which the present invention is applied.

As illustrated, a system for controlling an induction motor to which the present invention is applied, aiming at controlling an induction motor 160, includes a speed controller 110, a current controller 120, a first converting unit 130, a second converting unit 140, an inverter 150, a rotor position detecting unit 170, a magnetic flux angle calculating unit 180, and an estimating device 10 according to an embodiment of the present invention. Other components than the estimating device 10 are the same as those described above with reference to FIG. 1, so a detailed description thereof will be omitted.

The estimating device 10 receives d and q-axis currents in a synchronous reference system and an output voltage from the current controller 120, and outputs an error of rotor resistance. The estimated error of rotor resistance is provided to the current controller 120 and the magnetic flux angle calculating unit 180, so as to be updated.

Figure 5:
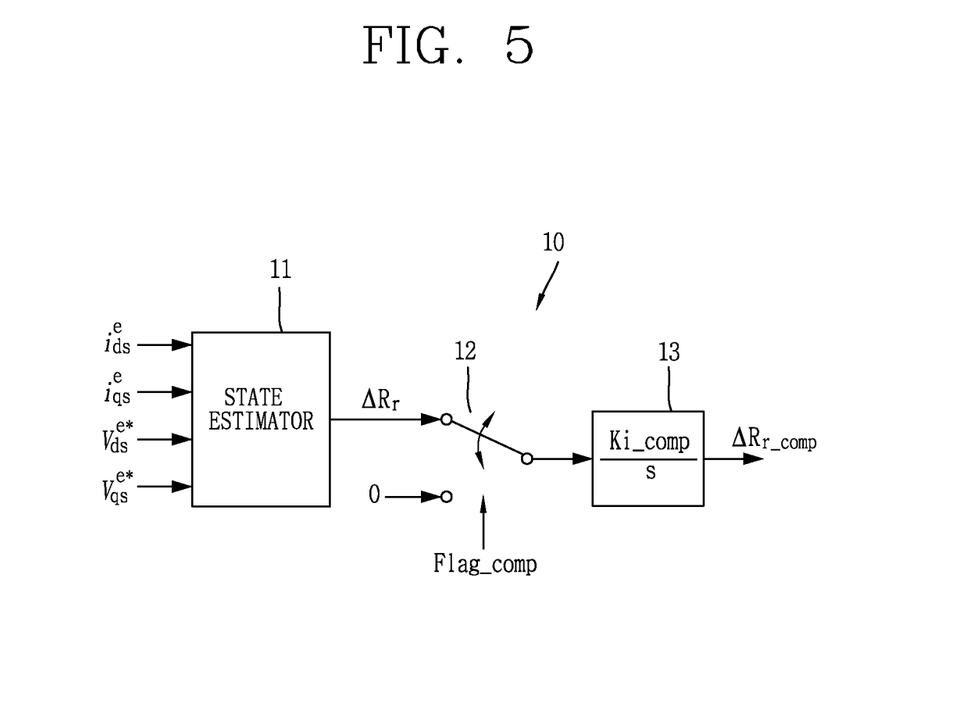
FIG. 5 is a view illustrating a configuration of an estimating device according to an embodiment of the present invention.

FIG. 5 is a view illustrating a configuration of an estimating device according to an embodiment of the present invention.

As illustrated in FIG. 5, the estimating device 10 includes a state estimator 11, a switch 12, and an integral controller 13.

The state estimator 11 calculates an error of rotor resistance by using the output voltages of the d and q-axis current controller 120 as described above with reference to FIGS. 3A and 3B and the feedback current (i.e., d and q-axis currents as outputs from the second converting unit 140).

The switch 12 is operated by a flag for estimating real-time rotor resistance. Namely, whether to estimate rotor resistance is determined according to a flag input. A flag input may be received by a higher control system (not shown).

The integral controller 13 obtains a difference between actual rotor resistance output from the state estimator 11 and nominal rotor resistance.

Hereinafter, an operation of the estimating device 10 according to an embodiment of the present invention will be described.

Voltage equations of the induction motor 160 in a general system of coordinates are the same as Equation 10 to Equation 13, and magnetic flux equations are the same as Equation 14 to Equation 17.

$V_{ds}^{\omega} = R_s i_{ds}^{\omega} + p\lambda_{ds}^{\omega} - \omega\lambda_{qs}^{\omega}$ [Equation 10]

$V_{qs}^{\omega} = R_s i_{qs}^{\omega} + p\lambda_{qs}^{\omega} + \omega\lambda_{ds}^{\omega}$ [Equation 11]

$V_{dr}^{\omega} = 0 = R_r i_{dr}^{\omega} + p\lambda_{dr}^{\omega} - (\omega - \omega_r)\lambda_{qr}^{\omega}$ [Equation 12]

$V_{qr}^{\omega} = 0 = R_r i_{dr}^{\omega} + p\lambda_{qr}^{\omega} + (\omega - \omega_r)\lambda_{dr}^{\omega}$ [Equation 13]

$\lambda_{ds}^{\omega} = L_s i_{ds}^{\omega} + L_m i_{dr}^{\omega}$ [Equation 14]

$\lambda_{qs}^{\omega} = L_s i_{qs}^{\omega} + L_m i_{qr}^{\omega}$ [Equation 15]

$\lambda_{dr}^{\omega} = L_m i_{ds}^{\omega} + L_r i_{dr}^{\omega}$ [Equation 16]

$\lambda_{qr}^{\omega} = L_m i_{qs}^{\omega} + L_r i_{qr}^{\omega}$ [Equation 17]

Voltage equations of the induction motor 160 in the synchronous reference frame obtained on the basis of Equation 10 to Equation 17 may be expressed by Equation 18 to Equation 21, and magnetic flux formulas correspond to Equation 22 to Equation 25.

$V_{ds}^{e} = R_s i_{ds}^{e} + p\lambda_{ds}^{e} - \omega_e \lambda_{qs}^{e}$ [Equation 18]

$V_{qs}^{e} = R_s i_{qs}^{e} + p\lambda_{qs}^{e} + \omega_e \lambda_{ds}^{e}$ [Equation 19]

$0 = R_r i_{dr}^{e} + p\lambda_{dr}^{e} - \omega_{sl} \lambda_{qr}^{e}$ [Equation 20]

$0 = R_r i_{qr}^{e} + p\lambda_{qr}^{e} + \omega_{sl} \lambda_{dr}^{e}$ [Equation 21]

$\lambda_{ds}^{e} = L_s i_{ds}^{e} + L_m i_{dr}^{e}$ [Equation 22]

$\lambda_{qs}^{e} = L_s i_{qs}^{e} + L_m i_{qr}^{e}$ [Equation 23]

$\lambda_{dr}^{e} = L_m i_{ds}^{e} + L_r i_{dr}^{e}$ [Equation 24]

$\lambda_{qr}^{e} = L_m i_{qs}^{e} + L_r i_r^{e}$ [Equation 25]

By using a rotor magnetic flux and a rotor current, a stator magnetic flux may be expressed as follows.

$$\lambda_{ds}^{e} = \sigma L_s i_{ds}^{e} + \frac{L_m}{L_r}\lambda_{dr}^{e}$$ [Equation 26]

$$\lambda_{qs}^{e} = \sigma L_s i_{qs}^{e} + \frac{L_m}{L_r}\lambda_{qr}^{e}$$ [Equation 27]

Voltage equations of the rotor may be organized on the basis of the foregoing equation as follows.

$$p\lambda_{dr}^{e} = R_r \frac{L_m}{L_r}i_{ds}^{e} - \frac{R_r}{L_r}\lambda_{dr}^{e} + (\omega_e - \omega_r)\lambda_{qr}^{e}$$ [Equation 28]

$$p\lambda_{qr}^{e} = R_r \frac{L_m}{L_r}i_{qs}^{e} - \frac{R_r}{L_r}\lambda_{qr}^{e} - (\omega_e - \omega_r)\lambda_{dr}^{e}$$ [Equation 29]

Also, d and q-axis voltage equations in the synchronous reference frame of the stator of the induction motor 160 may be expressed as follows.

$$V_{ds}^{e} = \left(R_s + R_r\frac{L_m^2}{L_r^2}\right)i_{ds}^{e} + \sigma L_s \frac{di_{ds}^{e}}{dt} - \omega_e \sigma L_s i_{qs}^{e} - R_r\frac{L_m}{L_r^2}\lambda_{dr}^{e}$$ [Equation 30]

$$V_{qs}^{e} = \left(R_s + R_r\frac{L_m^2}{L_r^2}\right)i_{qs}^{e} + \sigma L_s \frac{di_{qs}^{e}}{dt} + \omega_r \sigma L_s i_{ds}^{e} - \frac{R_r}{L_r}\sigma L_s i_{qs}^{e}$$ [Equation 31]

While indirect vector control is being performed and current is being controlled in a normal state, outputs from the current controller 120 are as follows.

$$V^e_{ds\_out} = \left(K_P + \frac{K_I}{s}\right)(i^{e*}_{ds} - i^e_{ds}) + V^e_{ds\_ff1} + V^e_{ds\_ff2} \quad \text{[Equation 32]}$$

$$V^e_{qs\_out} = \left(K_P + \frac{K_I}{s}\right)(i^{e*}_{qs} - i^e_{qs}) + V^e_{qs\_ff1} + V^e_{qs\_ff2} \quad \text{[Equation 33]}$$

Here, feed-forward items are defined as follows.

$$V^e_{ds\_ff1} = -\omega_e \sigma \hat{L}_s i^e_{qs} \quad \text{[Equation 34]}$$

$$V^e_{ds\_ff2} = -\sigma L_s \frac{\hat{R}_r}{L_r} \frac{(i^e_{qs})^2}{i^e_{ds}} \quad \text{[Equation 35]}$$

$$V^e_{qs\_ff1} = \omega_r L_s i^e_{ds} \quad \text{[Equation 36]}$$

$$V^e_{qs\_ff2} = \frac{\hat{R}_r}{L_r} L_s i^e_{qs} \quad \text{[Equation 37]}$$

If current control is smoothly performed by the current controller 120, the following conditions are satisfied.

$$V_{ds}^e = V_{ds\_out}^e \quad \text{[Equation 38]}$$

$$V_{qs}^e = V_{qs\_out}^e \quad \text{[Equation 39]}$$

Here, in a case in which inductance is accurate, voltages handled by the d and q-axis current controller in a normal state are as follows.

$$\left(K_P + \frac{K_I}{s}\right)(i^{e*}_{ds} - i^e_{ds}) \cong \frac{K_I}{s}(i^{e*}_{ds} - i^e_{ds}) = \quad \text{[Equation 40]}$$
$$R_s i^e_{ds} + \frac{\sigma L_s}{L_r}(\hat{R}_r - R_r) \frac{(i^e_{qs})^2}{i^e_{ds}}$$

$$\left(K_P + \frac{K_I}{s}\right)(i^{e*}_{qs} - i^e_{qs}) \cong \frac{K_I}{s}(i^{e*}_{qs} - i^e_{qs}) = R_s i^e_{qs} - \frac{L_s}{L_r}(\hat{R}_r - R_r)i^e_{qs} \quad \text{[Equation 41]}$$

Equation 40 and Equation 41 may be organized as follows.

$$\frac{K_I}{s}(i^{e*}_{ds} - i^e_{ds}) = R_s i^e_{ds} + \frac{1}{\Delta T_r}\sigma L_s \frac{(i^e_{qs})^2}{i^e_{ds}} \quad \text{[Equation 42]}$$

$$\frac{K_I}{s}(i^{e*}_{qs} - i^e_{qs}) = R_s i^e_{qs} - \frac{1}{\Delta T_r} L_s i^e_{qs} \quad \text{[Equation 43]}$$

Here, $\Delta T_r$ is a reciprocal number of a value obtained by dividing rotor resistance by rotor impedance. Equation 42 and Equation 43 may be substituted as follows.

$$\frac{K_I}{s}(i^{e*}_{ds} - i^e_{ds}) = M \quad \text{[Equation 44]}$$

$$\frac{K_I}{s}(i^{e*}_{qs} - i^e_{qs}) = N \quad \text{[Equation 45]}$$

When simultaneous equations of Equation 42 and Equation 43 are calculated by using Equation 44 and Equation 45, an error of the rotor resistance may be obtained as follows.

$$\frac{1}{\Delta T_r} = \frac{\Delta R_r}{L_r} = \frac{i^e_{ds}(Mi^e_{qs} - Ni^e_{ds})}{i^e_{qs}(\sigma L_s(i^e_{qs})^2 + L_s(i^e_{ds})^2)} \quad \text{[Equation 46]}$$

The integral controller 13 of FIG. 5 operates until when the value calculated by Equation 46 reaches zero (0), and the estimated error of the rotor resistance is continuously updated in the feed-forward of Equation 35 and Equation 37 and the calculation of the slip frequency of Equation 7, so as to be calculated as expressed by Equation 47.

$$\omega_{sl} = \frac{(\hat{R}_r + \Delta R_{r\_comp})}{L_r} \frac{i^e_{qs}}{i^{e*}_{ds}} \quad \text{[Equation 47]}$$

The rotor resistance may be obtained by using the result of Equation 46. The output $\Delta R_{r\_comp}$ from the integral controller 13 is converged on a certain value when $\Delta R_r$ is 0, and in this case, Equation 42 and Equation 43 may be organized as follows.

$$\frac{K_I}{s}(i^{e*}_{ds} - i^e_{ds}) = R_s i^e_{ds} \quad \text{[Equation 48]}$$

$$\frac{K_I}{s}(i^{e*}_{qs} - i^e_{qs}) = R_s i^e_{qs} \quad \text{[Equation 49]}$$

Thus, the stator resistance may be obtained by using Equation 50 or Equation 51

$$R_s = \frac{M}{i^e_{ds}} \quad \text{[Equation 50]}$$

$$R_s = \frac{N}{i^e_{qs}} \quad \text{[Equation 51]}$$

As described above, real-time estimation of the rotor resistance and stator resistance of the induction motor 160 may be achieved by using feed-forward of the current controller 120 and an output voltage from an integrator of the current controller 120. Performance of the estimated rotor resistance and stator resistance is determined by a control bandwidth of the current controller having the fastest dynamic characteristics in the system for controlling an induction motor, dynamic characteristics thereof are very fast and simple.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An apparatus for estimating a parameter of an induction motor including a current controller outputting d and q-axis voltages in a synchronous reference frame from d and q-axis current references and d and q-axis currents in the synchronous reference frame applied to the induction motor and a magnetic flux angle calculating unit calculating a magnetic flux angle by using d and q-axis currents in the synchronous reference frame applied to the induction motor and a rotor speed of the induction motor, in a control system, the apparatus comprising:
   a state estimator configured to calculate an error of rotor resistance upon receiving an output from the current controller and the d and q-axis currents in the synchronous reference frame applied to the induction motor;
   an integral controller configured to obtain a difference between the rotor resistance output from the state estimator and nominal rotor resistance; and
   a calculating unit configured to calculate stator resistance from an output from the integral controller, wherein the calculating unit calculates rotor resistance by a following equation, and the output from the integral controller is provided to the current controller and the magnetic flux angle calculating unit, so as to be updated, $$R_s = \frac{M}{i_{ds}^e}$$

wherein $R_s$ is stator resistance, $$M = \frac{K_I}{s}(i_{ds}^{e*} - i_{ds}^e),$$

and $i_{ds}^e$ is a d-axis current in the synchronous reference frame.

2. The apparatus of claim 1, further comprising:
   a switch configured to switch as to whether to estimate rotor resistance according to a flag input.

3. The apparatus of claim 1, wherein an error of the rotor resistance is calculated by a following equation, $$\frac{1}{\Delta T_r} = \frac{\Delta R_r}{L_r} = \frac{i_{ds}^e(Mi_{qs}^e - Ni_{ds}^e)}{i_{qs}^e(\sigma L_s(i_{qs}^e)^2 + L_s(i_{ds}^e)^2)}$$

wherein $\Delta T_r$ is a reciprocal number of a value obtained by dividing rotor resistance by rotor impedance.

4. The apparatus of claim 3, wherein the integral controller operates until when the error of the rotor resistance reaches 0.

5. The apparatus of claim 4, wherein a slip frequency of the induction motor is calculated by $$\omega_{sl} = \frac{(\hat{R}_r + \Delta R_{r\_comp}) i_{qs}^e}{L_r} \frac{i_{qs}^e}{i_{ds}^{e*}}.$$

6. An apparatus for estimating a parameter of an induction motor including a current controller outputting d and q-axis voltages in a synchronous reference frame from d and q-axis current references and d and q-axis currents in the synchronous reference frame applied to the induction motor and a magnetic flux angle calculating unit calculating a magnetic flux angle by using d and q-axis currents in the synchronous reference frame applied to the induction motor and a rotor speed of the induction motor, in a control system, the apparatus comprising:
   a state estimator configured to calculate an error of rotor resistance upon receiving an output from the current controller and the d and q-axis currents in the synchronous reference frame applied to the induction motor;
   an integral controller configured to obtain a difference between the rotor resistance output from the state estimator and nominal rotor resistance; and
   a calculating unit configured to calculate stator resistance from an output from the integral controller, wherein the calculating unit calculates;
   rotor resistance by a following equation, and the output from the integral controller is provided to the current controller and the magnetic flux angle calculating unit, so as to be updated, $$R_s = \frac{N}{i_{qs}^e}$$

wherein $$N = \frac{K_I}{s}(i_{qs}^{e*} - i_{qs}^e)$$

and $i_{qs}^e$ is a d-axis current in the synchronous reference frame.

7. The apparatus of claim 6, further comprising:
   a switch configured to switch as to whether to estimate rotor resistance according to a flag input.

8. The apparatus of claim 6, wherein an error of the rotor resistance is calculated by a following equation, $$\frac{1}{\Delta T_r} = \frac{\Delta R_r}{L_r} = \frac{i_{ds}^e(Mi_{qs}^e - Ni_{ds}^e)}{i_{qs}^e(\sigma L_s(i_{qs}^e)^2 + L_s(i_{ds}^e)^2)}$$

wherein $\Delta T_r$ is a reciprocal number of a value obtained by dividing rotor resistance by rotor impedance.

* * * * *